US011388319B2

(12) United States Patent
Hanjo et al.

(10) Patent No.: US 11,388,319 B2
(45) Date of Patent: Jul. 12, 2022

(54) COUNTER-ROTATING FAN AND IMAGE CAPTURING DEVICE

(71) Applicant: SONY CORPORATION, Tokyo (JP)

(72) Inventors: Manabu Hanjo, Tokyo (JP); Kuniharu Uchikawa, Tokyo (JP); Shigeru Kitamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,336

(22) PCT Filed: May 13, 2019

(86) PCT No.: PCT/JP2019/018955
§ 371 (c)(1),
(2) Date: Jan. 6, 2021

(87) PCT Pub. No.: WO2020/017132
PCT Pub. Date: Jan. 23, 2020

(65) Prior Publication Data
US 2021/0274078 A1 Sep. 2, 2021

(30) Foreign Application Priority Data
Jul. 17, 2018 (JP) .............................. JP2018-134317

(51) Int. Cl.
H04N 5/225 (2006.01)
F04D 25/08 (2006.01)
(Continued)

(52) U.S. Cl.
CPC ......... H04N 5/22521 (2018.08); F04D 25/08 (2013.01); F04D 25/166 (2013.01); F04D 29/325 (2013.01); H04N 5/2252 (2013.01)

(58) Field of Classification Search
CPC ...... F04D 19/024; F04D 25/08; F04D 25/166; F04D 29/325; F04D 29/327;
(Continued)

(56) References Cited

U.S. PATENT DOCUMENTS 7,909,568 B2 * 3/2011 Ishihara ................ F04D 29/626
415/214.1
2007/0059155 A1 * 3/2007 Ishihara ................ F04D 19/024
415/60

(Continued)

FOREIGN PATENT DOCUMENTS

CN 1971065 A 5/2007
EP 1764511 A1 3/2007
(Continued)

OTHER PUBLICATIONS

International Search Report and Written Opinion of PCT Application No. PCT/JP2019/018955, dated Aug. 13, 2019, 07 pages of ISRWO.

Primary Examiner — Amy R Hsu
(74) Attorney, Agent, or Firm — Chip Law Group

(57) ABSTRACT

Sound is reduced after securing sufficient air volume. An intake side fan including a first housing, a first drive motor that functions as a drive source, a first hub that is rotated by drive force of the first drive motor, and a plurality of first impellers that is rotated along with the first hub; and an exhaust side fan including a second housing, a second drive motor that functions as a drive source, a second hub that is rotated by drive force of the second drive motor, and a plurality of second impellers that is rotated along with the second hub are provided. An axial maximum chord length of the first impellers is smaller than an axial maximum chord length of the second impellers.

10 Claims, 11 Drawing Sheets

(51) Int. Cl.
*F04D 25/16* (2006.01)
*F04D 29/32* (2006.01)

(58) Field of Classification Search
CPC .... F04D 29/329; F04D 29/384; F04D 29/545; F04D 29/582; F05D 2240/30; H04N 5/2252; H04N 5/22521
See application file for complete search history.

(56) References Cited

U.S. PATENT DOCUMENTS

| | | | | |
|---|---|---|---|---|
| 2010/0054931 | A1* | 3/2010 | Yoshida | F04D 29/384 |
| | | | | 415/199.5 |
| 2011/0142612 | A1* | 6/2011 | Kato | F04D 19/024 |
| | | | | 415/206 |
| 2014/0086761 | A1* | 3/2014 | Abe | F04D 27/004 |
| | | | | 417/338 |
| 2014/0233178 | A1* | 8/2014 | Franz | F04D 19/007 |
| | | | | 361/679.48 |
| 2015/0152879 | A1* | 6/2015 | Tzeng | F04D 19/002 |
| | | | | 416/223 R |
| 2016/0040684 | A1* | 2/2016 | Hayashida | F04D 25/0646 |
| | | | | 417/423.7 |
| 2018/0195526 | A1* | 7/2018 | Hakozaki | F04D 19/002 |
| 2018/0249873 | A1* | 9/2018 | Yoshida | F04D 17/12 |
| 2019/0260267 | A1* | 8/2019 | Diemunsch | H02K 9/04 |
| 2020/0056618 | A1* | 2/2020 | Decker | F04D 19/007 |

FOREIGN PATENT DOCUMENTS

| | | | | |
|---|---|---|---|---|
| JP | 3128807 U | 1/2007 | | |
| JP | 2007-077890 A | 3/2007 | | |
| JP | 2007077890 A | * 3/2007 | ........... | F04D 19/007 |
| JP | 2007-263085 A | 10/2007 | | |

\* cited by examiner

COUNTER-ROTATING FAN AND IMAGE CAPTURING DEVICE

CROSS REFERENCE TO RELATED APPLICATIONS

This application is a U.S. National Phase of International Patent Application No. PCT/JP2019/018955 filed on May 13, 2019, which claims priority benefit of Japanese Patent Application No. JP 2018-134317 filed in the Japan Patent Office on Jul. 17, 2018. Each of the above-referenced applications is hereby incorporated herein by reference in its entirety.

TECHNICAL FIELD

The present technology relates to a technical field about a counter-rotating fan having an intake side fan and an exhaust side fan with impellers rotating in opposite directions, and an image capturing device including the counter-rotating fan.

BACKGROUND ART

Various electronic devices including image capturing devices such as video cameras and still cameras are often provided with cooling fans for lowering the internal temperature to secure a good driving state.

There are various types of cooling fans. For example, in a case where a cooling fan is used for an image capturing device and the like, after a certain amount of air volume is secured, sound reduction is preferred to improve usability during image capturing and reduce effects on input and output of a voice and the like.

Examples of such a cooling fan include a counter-rotating fan (see, for example, Patent Document 1). The counter-rotating fan is often used, for example, to cool a server. By reversing rotation directions of an intake side fan and an exhaust side fan, energy resulting in a loss as a twist of a wind flow is canceled out. Therefore, the counter-rotating fan has an advantage of improving efficiency and securing high air volume and high static pressure.

CITATION LIST

Patent Document

Patent Document 1: Japanese Patent Application Laid-Open No. 2007-263085

SUMMARY OF THE INVENTION

Problems to be Solved by the Invention

In that connection, in a case where a counter-rotating fan is used for an electronic device such as an image capturing device, since a large air volume like server cooling is not needed, for example, the fan is used in a low number of rotations state of 2000 rpm to 3000 rpm. If a noise level of the counter-rotating fan becomes large in the low number of rotations state, the noise will affect usability of the electronic device and the like.

Therefore, an object of the counter-rotating fan and the image capturing device of the present technology is to overcome the problems described above and to achieve sound reduction after securing a sufficient air volume.

Solutions to Problems

Firstly, a counter-rotating fan according to the present technology includes: an intake side fan including a first housing, a first drive motor that functions as a drive source, a first hub that is rotated by drive force of the first drive motor, and a plurality of first impellers that is rotated along with the first hub; and an exhaust side fan including a second housing, a second drive motor that functions as a drive source, a second hub that is rotated by drive force of the second drive motor, and a plurality of second impellers that is rotated along with the second hub. An axial maximum chord length of the first impellers is smaller than an axial maximum chord length of the second impellers.

With this configuration, the axial maximum chord length of the second impellers in the exhaust side fan in which the noise level tends to be larger than the noise level of the intake side fan is greater than the axial maximum chord length of the first impellers. Therefore, even if the number of rotations of the exhaust side fan is reduced, it is possible to obtain a sufficient air volume in the exhaust side fan.

Secondly, in the counter-rotating fan according to the present technology described above, preferably, the number of the first impellers is larger than the number of the second impellers.

This configuration makes it possible to increase the air volume of the intake side fan whose axial maximum chord length is smaller than the axial maximum chord length of the exhaust side fan.

Thirdly, in the counter-rotating fan according to the present technology described above, preferably, the number of rotations of the first impellers is larger than the number of rotations of the second impellers.

This configuration makes it possible to increase the air volume of the intake side fan whose axial maximum chord length is smaller than the axial maximum chord length of the exhaust side fan.

Fourthly, in the counter-rotating fan according to the present technology described above, preferably, the first hub and the plurality of first impellers are positioned inside the first housing, the second hub and the plurality of second impellers are positioned inside the second housing, a diameter of the first hub is equal to or less than half of one side of the first housing in a direction orthogonal to a coupling direction of the intake side fan and the exhaust side fan, and a diameter of the second hub is equal to or less than half of one side of the second housing in the direction orthogonal to the coupling direction of the intake side fan and the exhaust side fan.

With this configuration, the sizes of the first hub and second hub are relatively smaller than the overall sizes of the intake side fan and the exhaust side fan, respectively.

Fifthly, in the counter-rotating fan according to the present technology described above, preferably, the diameters of the first hub and the second hub are equal to or less than 20 mm.

With this configuration, the sizes of the first hub and the second hub decrease, making it possible to increase the radial chord lengths of the first impellers and the second impellers.

Sixthly, in the counter-rotating fan according to the present technology described above, preferably, the intake side fan is provided with a plurality of first stays that protrudes from the first housing and holds the first drive motor, the exhaust side fan is provided with a plurality of second stays that protrudes from the second housing and holds the second drive motor, the first stays are positioned at an end on a side of the exhaust side fan, and the second stays are positioned at an end on a side of the intake side fan.

With this configuration, the first stays and the second stays are positioned adjacent to each other. Therefore, effects of the first stays and the second stays on the air flowing from the intake side fan to the exhaust side fan decrease, and turbulence is unlikely to occur in the air taken in by the intake side fan.

Seventhly, in the counter-rotating fan according to the present technology described above, preferably, equal numbers of the first stays and the second stays are provided, and the first stays and the second stays are positioned facing each other in a coupling direction of the intake side fan and the exhaust side fan.

With this configuration, effects of the first stays and the second stays on the air flowing from the intake side fan to the exhaust side fan are minimized, and turbulence is unlikely to occur in the air taken in by the intake side fan and heading for the exhaust side fan.

Eighthly, in the counter-rotating fan according to the present technology described above, preferably, the first stays and the second stays are each provided in fours, and the plurality of first stays and the plurality of second stays are each positioned at equal spaces in a circumferential direction.

With this configuration, since the first stays and the second stays are each positioned adjacent to each other at equal spaces, effects of the first stays and the second stays on the air flowing from the intake side fan to the exhaust side fan decrease. Turbulence is unlikely to occur in the air taken in by the intake side fan, and a holding state of the first drive motor and the second drive motor becomes stable.

Ninthly, in the counter-rotating fan according to the present technology described above, preferably, a 40 mm square type is used as the intake side fan and the exhaust side fan.

With this configuration, both the intake side fan and the exhaust side fan become small, and the counter-rotating fan becomes small as a whole.

Tenthly, an image capturing device according to the present technology includes: an image capturing element that is disposed inside an outer enclosure and converts an optical image into an electrical signal; and a counter-rotating fan that cools each unit disposed inside the outer enclosure. The counter-rotating fan includes: an intake side fan including a first housing, a first drive motor that functions as a drive source, a first hub that is rotated by drive force of the first drive motor, and a plurality of first impellers that is rotated along with the first hub; and an exhaust side fan including a second housing, a second drive motor that functions as a drive source, a second hub that is rotated by drive force of the second drive motor, and a plurality of second impellers that is rotated along with the second hub. An axial maximum chord length of the first impellers is smaller than an axial maximum chord length of the second impellers.

With this configuration, in the counter-rotating fan, the axial maximum chord length of the second impellers in the exhaust side fan in which the noise level tends to be larger than the noise level of the intake side fan is greater than the axial maximum chord length of the first impellers. Therefore, even if the number of rotations of the exhaust side fan is reduced, it is possible to obtain a sufficient air volume in the exhaust side fan.

Effects of the Invention

With the present technology, the axial maximum chord length of the second impellers in the exhaust side fan in which the noise level tends to be larger than the noise level of the intake side fan is greater than the axial maximum chord length of the first impellers. Therefore, even if the number of rotations of the exhaust side fan is reduced, it is possible to obtain a sufficient air volume in the exhaust side fan, it is possible to reduce sound by reducing the number of rotations of the exhaust side fan, and it is possible to reduce sound after securing a sufficient air volume.

Note that effects described in the present specification are merely illustrative and not restrictive, and other effects may be produced.

MODE FOR CARRYING OUT THE INVENTION

A mode for carrying out the present technology will be described below with reference to the accompanying drawings.

A counter-rotating fan is configured by coupling of an intake side fan and an exhaust side fan. In the following description, it is assumed that a coupling direction of the intake side fan and the exhaust side fan is a front-back direction, the intake side fan side is front, and the exhaust side fan side is back, indicating the front-back, up-down, left-right directions.

Note that the front-back, up-down, left-right directions shown below are for convenience of description, and the implementation of the present technology is not limited to these directions.

<Configuration of Counter-Rotating Fan>

Figure 1:
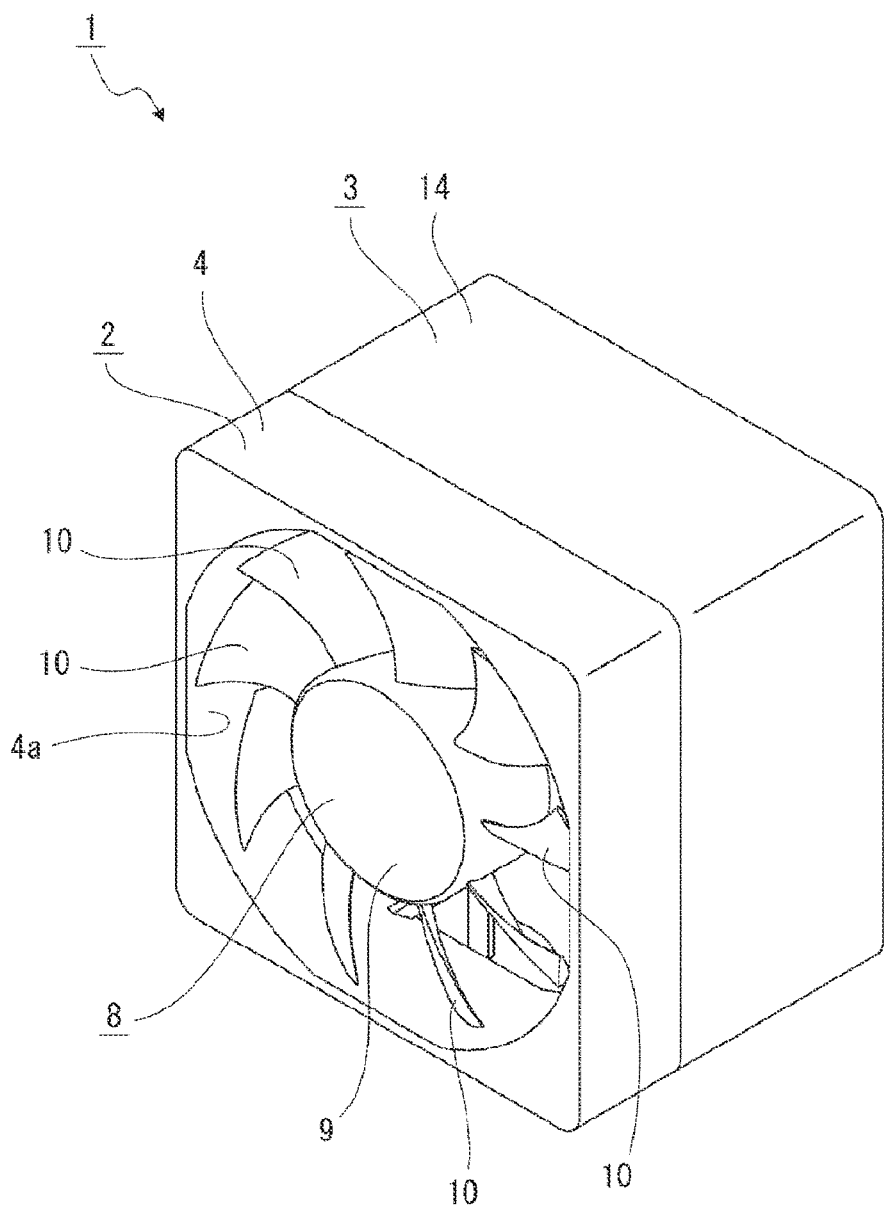
FIG. 1 shows an embodiment of a counter-rotating fan and an image capturing device of the present technology together with FIGS. 2 to 11. This figure is a perspective view of the counter-rotating fan.
Figure 2:
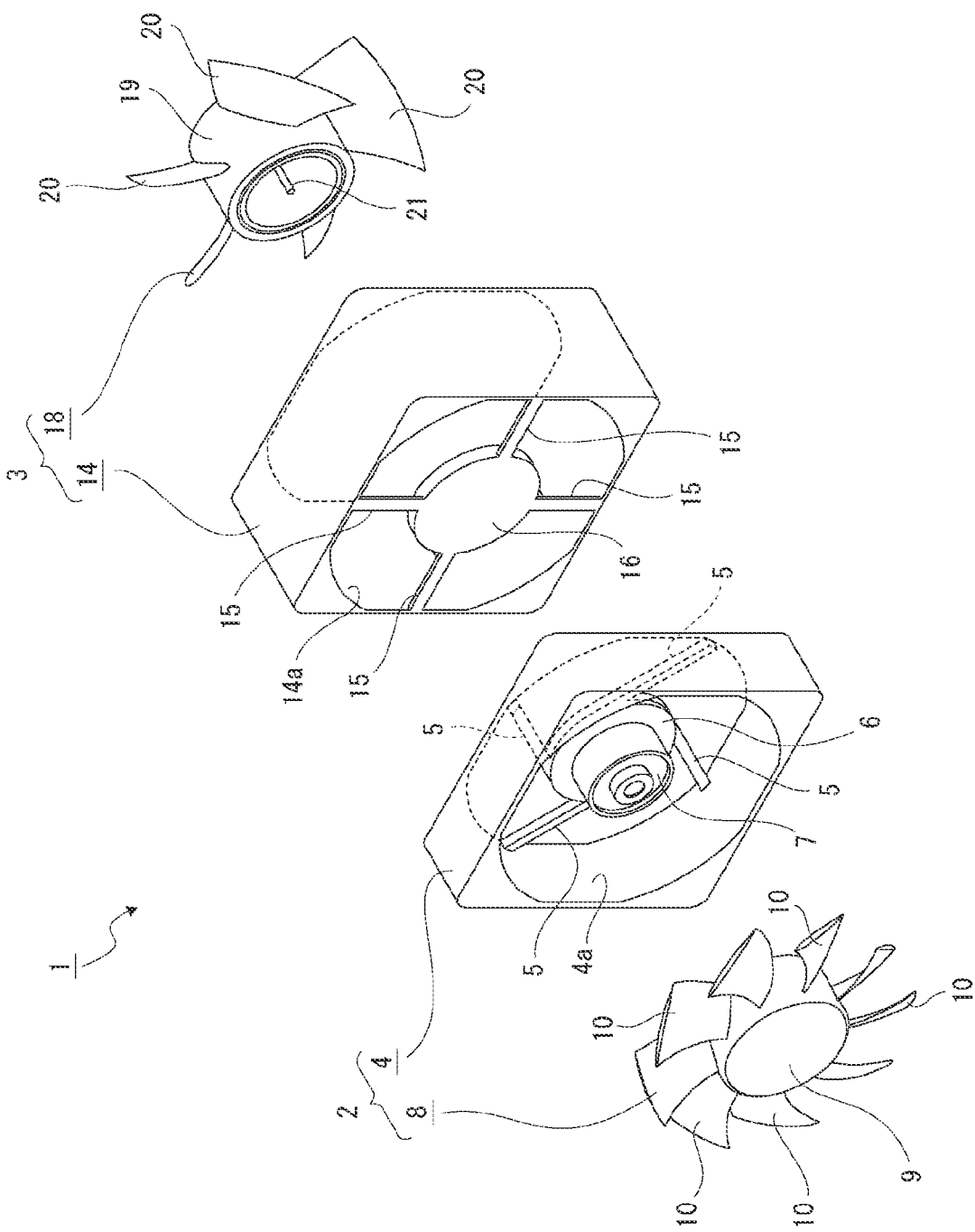
FIG. 2 is an exploded perspective view of the counter-rotating fan.
Figure 3:
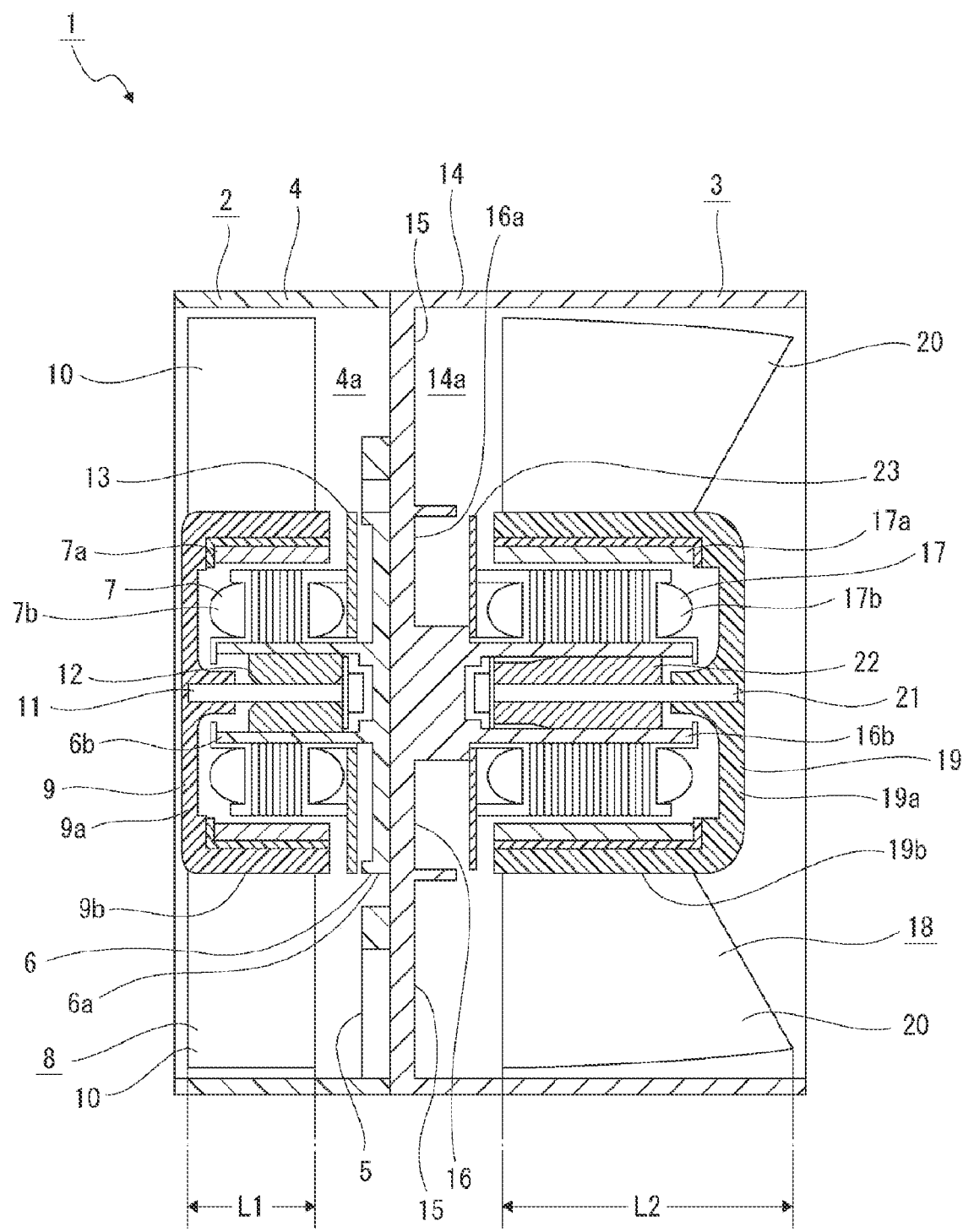
FIG. 3 is a cross-sectional view of the counter-rotating fan.

A counter-rotating fan 1 is configured by coupling of an intake side fan 2 and an exhaust side fan 3 (see FIGS. 1 to 3).

The intake side fan 2 includes a first housing 4, first stays 5, 5, . . . , a first support base 6, a first drive motor 7, and a first rotating body 8. As the intake side fan 2, for example, a 40 mm square type is used.

The first housing 4 is formed in a tubular shape with a front-back direction set in an axial direction, an outer shape is formed in a substantially square shape, and an inner space is formed as a columnar arrangement space 4a. A thickness of the first housing 4 in the front-back direction is set at, for example, 10 mm.

Figure 4:
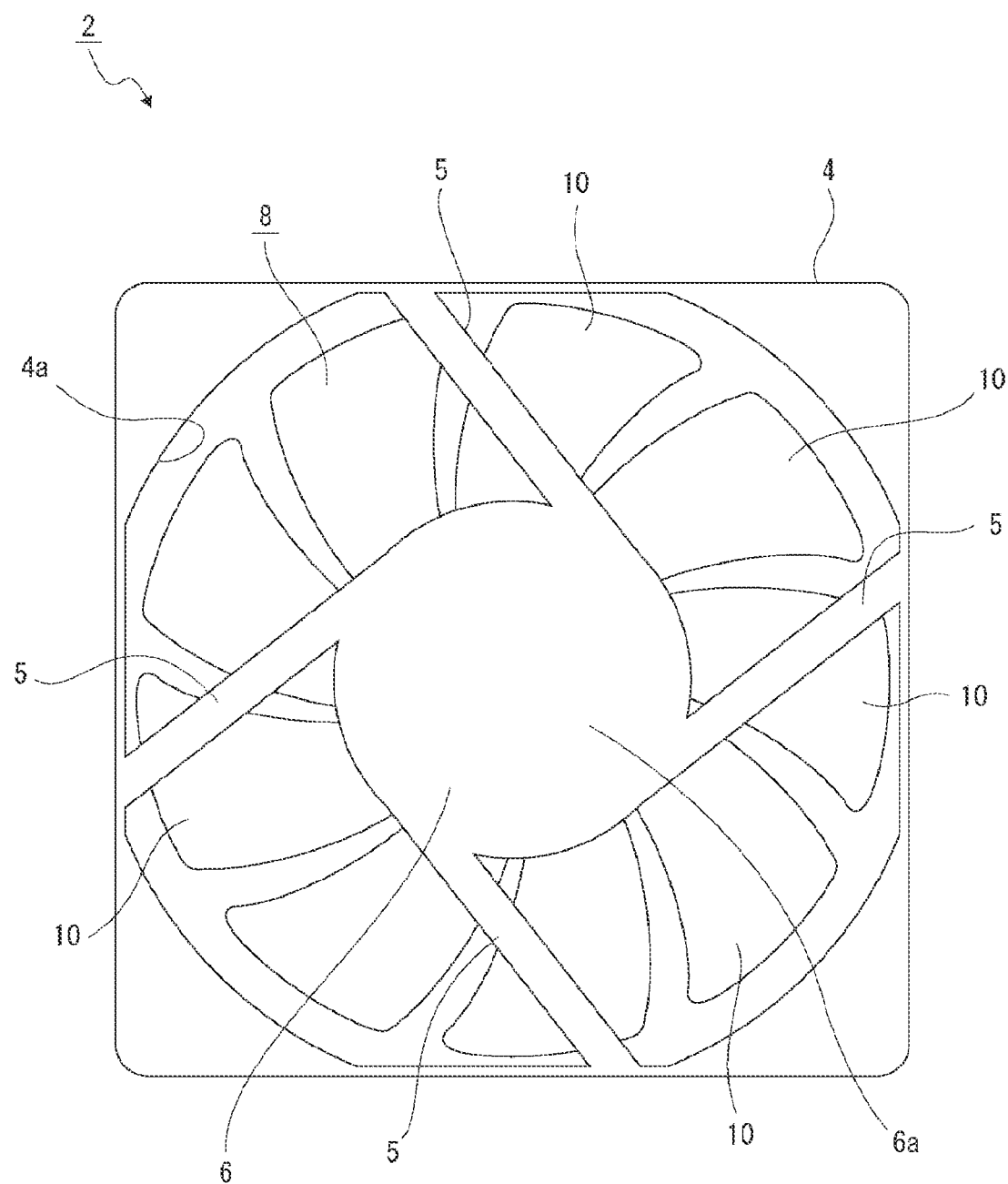
FIG. 4 is a rear view of an intake side fan.

The first stays 5, 5, . . . protrude from an inner peripheral portion at a rear end of the first housing 4 in a plane orthogonal to the front-back direction, and is formed, for example, integrally with the first housing 4 (see FIG. 4). For example, four first stays 5, 5, . . . are provided and are positioned at equal spaces in a circumferential direction. The first stays 5, 5, . . . are formed, for example, in a straight line, and are positioned at an inclination of, for example, 45 degrees with respect to the left-right direction.

The first support base 6 is positioned in a central portion of the first housing 4, and includes a substantially disk-shaped connecting surface 6a and a substantially cylindrical support cylinder 6b protruding forward from the connecting surface 6a. In the first support base 6, an outer peripheral portion of the connecting surface 6a is connected to the first stays 5, 5, . . . . The first support base 6 is, for example, integrally formed with the first stays 5, 5, . . . .

The first drive motor 7 is supported by the first support base 6 and includes a rotor 7a having a magnet and a stator 7b having a coil (see FIG. 3). The rotor 7a is positioned on the outer peripheral side of the stator 7b and is rotated with respect to the stator 7b.

The first rotating body 8 includes a first hub 9, first impellers 10, 10, . . . , and a first rotating shaft 11 (see FIGS. 2 and 3). The first hub 9 includes a substantially disk-shaped base surface 9a pointing in the front-back direction and a cylindrical outer peripheral surface 9b protruding rearward from the outer peripheral portion of the base surface 9a. The rotor 7a is fixed to an inner peripheral surface of the outer peripheral surface 9b. The first impellers 10, 10, . . . protrude from the outer peripheral surface 9b, and for example, nine pieces are provided. In the first rotating shaft 11, an axial direction is set in the front-back direction, and a front end is fixed to a center portion of the base surface 9a in the first hub 9.

The first rotating shaft 11 is rotatably supported by a substantially cylindrical first sleeve bearing 12. The first sleeve bearing 12 is fixed to the support cylinder 6b in a state of being inserted into the support cylinder 6b of the first support base 6.

On a front side of the connecting surface 6a in the first support base 6, a first substrate 13 for supplying a current to the stator 7b and the like is disposed.

If the rotor 7a is rotated with respect to the stator 7b of the first drive motor 7 in the intake side fan 2 configured as described above, the first rotating body 8 is integrally rotated with the rotor 7a with respect to the first sleeve bearing 12 with the first rotating shaft 11 as a fulcrum.

The exhaust side fan 3 includes a second housing 14, second stays 15, 15, . . . , a second support base 16, a second drive motor 17, and a second rotating body 18. As the exhaust side fan 3, for example, a 40 mm square type is used.

The second housing 14 is formed in a tubular shape with a front-back direction set in an axial direction, an outer shape is formed in a substantially square shape, and an inner space is formed as a columnar arrangement space 14a. A thickness of the second housing 14 in the front-back direction is set at, for example, 20 mm.

Figure 5:
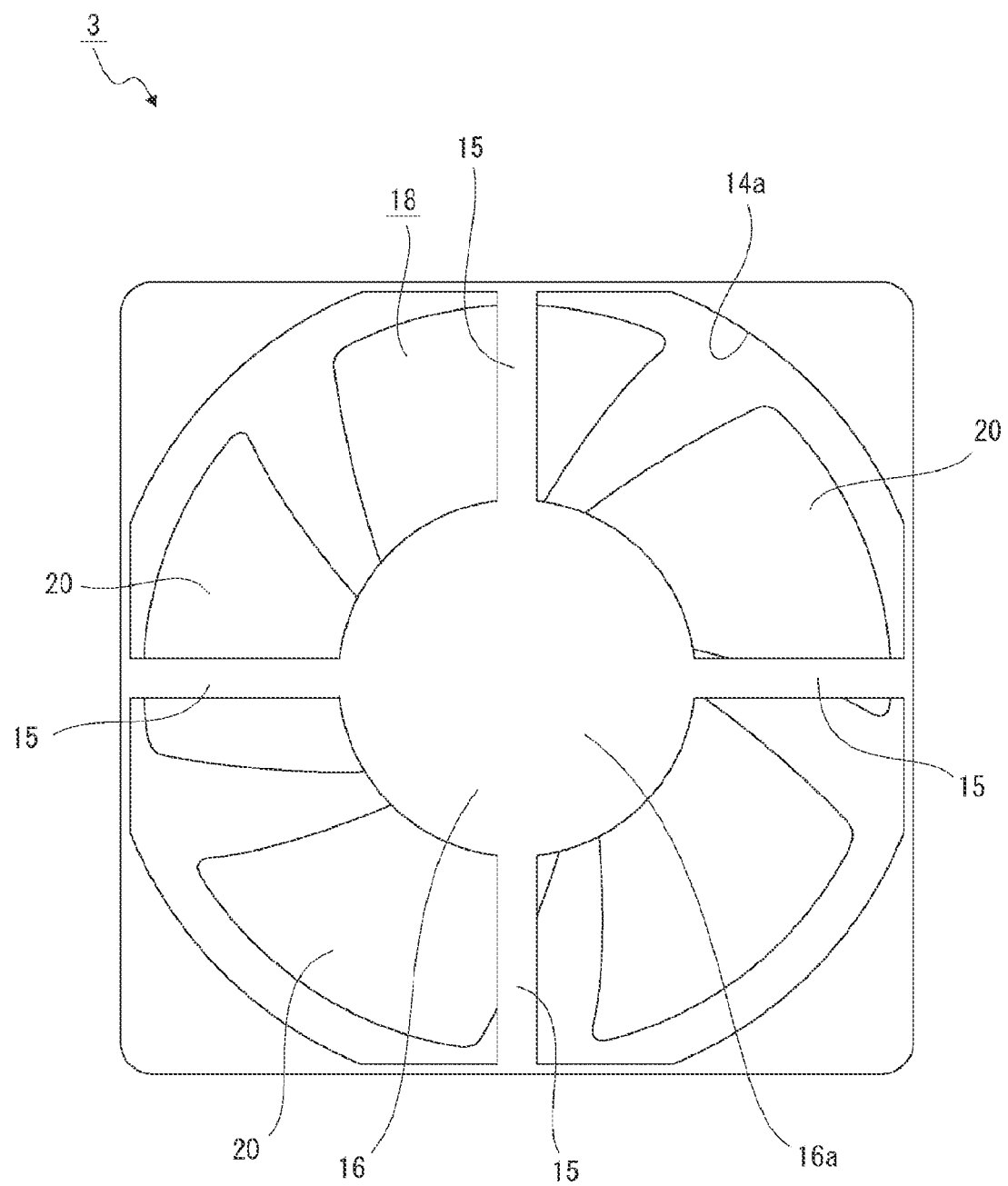
FIG. 5 is a front view of an exhaust side fan.

The second stays 15, 15, . . . protrude from an inner peripheral portion at a front end of the second housing 14 in a plane orthogonal to the front-back direction, and is formed, for example, integrally with the second housing 14 (see FIG. 5). For example, four second stays 15, 15, . . . are provided and are positioned at equal spaces in a circumferential direction. The second stays 15, 15, . . . are formed, for example, in a straight line and are positioned extending in the up-down direction or left-right direction.

The second support base 16 is positioned in a central portion of the second housing 14, and includes a substantially disk-shaped connecting surface 16a and a substantially cylindrical support cylinder 16b protruding rearward from the connecting surface 16a. In the second support base 16, an outer peripheral portion of the connecting surface 16a is connected to the second stays 15, 15, . . . . The second support base 16 is, for example, integrally formed with the second stays 15, 15, . . . .

The second drive motor 17 is supported by the second support base 16 and includes a rotor 17a having a magnet and a stator 17b having a coil (see FIG. 3). The rotor 17a is positioned on the outer peripheral side of the stator 17b and is rotated with respect to the stator 17b.

The second rotating body 18 includes a second hub 19, second impellers 20, 20, . . . , and a second rotating shaft 21 (see FIGS. 2 and 3). The second hub 19 includes a substantially disk-shaped base surface 19a pointing in the front-back direction and a cylindrical outer peripheral surface 19b protruding forward from the outer peripheral portion of the base surface 19a. The rotor 17a is fixed to an inner peripheral surface of the outer peripheral surface 19b. The second impellers 20, 20, . . . protrude from the outer peripheral surface 19b, and for example, five pieces are provided. In the second rotating shaft 21, an axial direction is set in the front-back direction, and a rear end is fixed to a center portion of the base surface 19a in the second hub 19.

The second rotating shaft 21 is rotatably supported by a substantially cylindrical second sleeve bearing 22. The second sleeve bearing 22 is fixed to the support cylinder 16b in a state of being inserted into the support cylinder 16b of the second support base 16.

On a rear side of the connecting surface 16a in the second support base 16, a second substrate 23 for supplying a current to the stator 17b and the like is disposed.

If the rotor 17a is rotated with respect to the stator 17b of the second drive motor 17 in the exhaust side fan 3 configured as described above, the second rotating body 18 is integrally rotated with the rotor 17a with respect to the second sleeve bearing 22 with the second rotating shaft 21 as a fulcrum.

In the counter-rotating fan 1, the rear surface of the intake side fan 2 and the front surface of the exhaust side fan 3 are coupled (see FIGS. 1 and 3). In a state where the intake side fan 2 and the exhaust side fan 3 are coupled, the first stays 5, 5, . . . are positioned at an end on the exhaust side fan 3 side, and the second stays 15, 15, . . . are positioned at an end on the intake side fan 2 side.

An axial maximum chord length L1 of the first impellers 10 in the intake side fan 2 is set at, for example, 6.5 mm. An axial maximum chord length L2 of the second impellers 20 in the exhaust side fan 3 is set at, for example, 14.0 mm. The axial maximum chord lengths are the maximum lengths of the first impellers 10 and the second impellers 20 in the axial direction (front-back direction).

In the counter-rotating fan 1, a rotation direction of the first rotating body 8 in the intake side fan 2 and a rotation direction of the second rotating body 18 in the exhaust side fan 3 are opposite to each other. For example, the number of rotations of the first impellers 10 (first rotating body 8) is larger than the number of rotations of the second impellers 20 (second rotating body 18). For example, the number of rotations of the first impellers 10 is 2000 rpm to 2800 rpm, and the number of rotations of the second impellers 20 is 1800 rpm to 2700 rpm. In particular, it is preferable that the first impellers 10 have a number of rotations of about 2200 rpm and the second impellers 20 have a number of rotations of 2100 rpm.

Furthermore, in the counter-rotating fan 1, a diameter of the first hub 9 is equal to or less than half of one side of the first housing 4 in the up-down direction or left-right direction, and a diameter of the second hub 19 is equal to or less than half of one side of the second housing 14 in the up-down direction or left-right direction. The diameters of the first hub 9 and the second hub 9 are, for example, equal to or less than 20 mm, preferably about 18 mm, and more preferably about 16 mm.

<Measurement Results About Counter-Rotating Fan and the Like>

Measurement results about the counter-rotating fan 1 and the like will be described below (see FIGS. 6 to 8). In the measurement results, the performance of a reference product (benchmark product) is shown as a reference value F, and as the benchmark product, a single fan of a 40 mm square type with the axial maximum chord length of 15.5 mm is used. A noise level (noise value) of the benchmark product is 34.9 dbA, and this value is used as the reference value F of the noise level.

To begin with, a first measurement result will be described (see FIG. 6).

The first measurement result is a result of measuring the noise level of counter-rotating fans having different axial maximum chord lengths. In FIG. 6, the horizontal axis shows the length of the axial maximum chord length, and the vertical axis shows the noise level.

In the first measurement, counter-rotating fans A, B, C, and D are used as measurement targets. The counter-rotating fan A includes an intake side fan with a thickness of a housing in the front-back direction of 10 mm and an axial maximum chord length of 6.5 mm, and an exhaust side fan with a thickness of a housing in the front-back direction of 10 mm and an axial maximum chord length of 6.5 mm. The counter-rotating fan B includes an intake side fan with a thickness of a housing in the front-back direction of 10 mm and an axial maximum chord length of 6.5 mm, and an exhaust side fan with a thickness of a housing in the front-back direction of 15 mm and an axial maximum chord length of 8.5 mm. The counter-rotating fan C includes an intake side fan with a thickness of a housing in the front-back direction of 10 mm and an axial maximum chord length of 6.5 mm, and an exhaust side fan with a thickness of a housing in the front-back direction of 20 mm and an axial maximum chord length of 14.0 mm. The counter-rotating fan D includes an intake side fan with a thickness of a housing in the front-back direction of 20 mm and an axial maximum chord length of 14.0 mm, and an exhaust side fan with a thickness of a housing in the front-back direction of 20 mm and an axial maximum chord length of 14.0 mm. The counter-rotating fans A, B, C, and D are all 40 mm square type, and the counter-rotating fan C is a fan corresponding to the counter-rotating fan 1.

The first measurement result is a result of measuring the noise level when a constant reference air volume (0.05 cubic meters air volume per minute) and a constant reference pressure (static pressure 5 Pa) are obtained in each counter-rotating fan.

In the first measurement, a result is obtained in which the counter-rotating fan A has a noise level higher than the reference value F, the counter-rotating fan B has a noise level substantially equivalent to the reference value F, and the counter-rotating fan C and the counter-rotating fan D have noise levels lower than the reference value F. From the first measurement result, it is confirmed that the noise level can be set to be lower than the reference value F if the axial maximum chord length of the exhaust side fan is 14.0 mm.

Furthermore, in the first measurement result, a result is also obtained in which if the axial maximum chord length of the exhaust side fan is 14.0 mm or more, the noise level does not decrease significantly even in a case where the axial maximum chord length of the intake side fan increases. From the viewpoint of miniaturization, it is also confirmed that it is preferable that the axial maximum chord length of the intake side fan is smaller than the axial maximum chord length of the exhaust side fan.

Next, a second measurement result will be described (see FIGS. 7 and 8).

The second measurement result is a result of measuring the noise level when a constant reference air volume (0.05 cubic meters air volume per minute) and a constant reference pressure (static pressure 5 Pa) are obtained for the benchmark product and the counter-rotating fan 1. In FIG. 7, left data R is data for the benchmark product, central data S1 is data for the counter-rotating fan 1, and the vertical axis indicates the noise level. Right data S2 is data when a drive voltage for the counter-rotating fan 1 is increased to obtain an air volume that is increased by about 30% with respect to the reference air volume (0.064 cubic meters of air volume per minute).

In the data R, the number of rotations is 3200 rpm. In the data S1, the number of rotations of the intake side fan is 2200 rpm and the number of rotations of the exhaust side fan is 2100 rpm. In the data S2, the number of rotations of the intake side fan is 2700 rpm and the number of rotations of the exhaust side fan is 2600 rpm.

In the second measurement, a result is obtained in which the noise level of the counter-rotating fan 1 when obtaining the same air volume is lower than the noise level of the benchmark product, and is equivalent to the noise level of the benchmark product even in a case where the air volume of the counter-rotating fan 1 is increased by about 30%.

Figure 7:
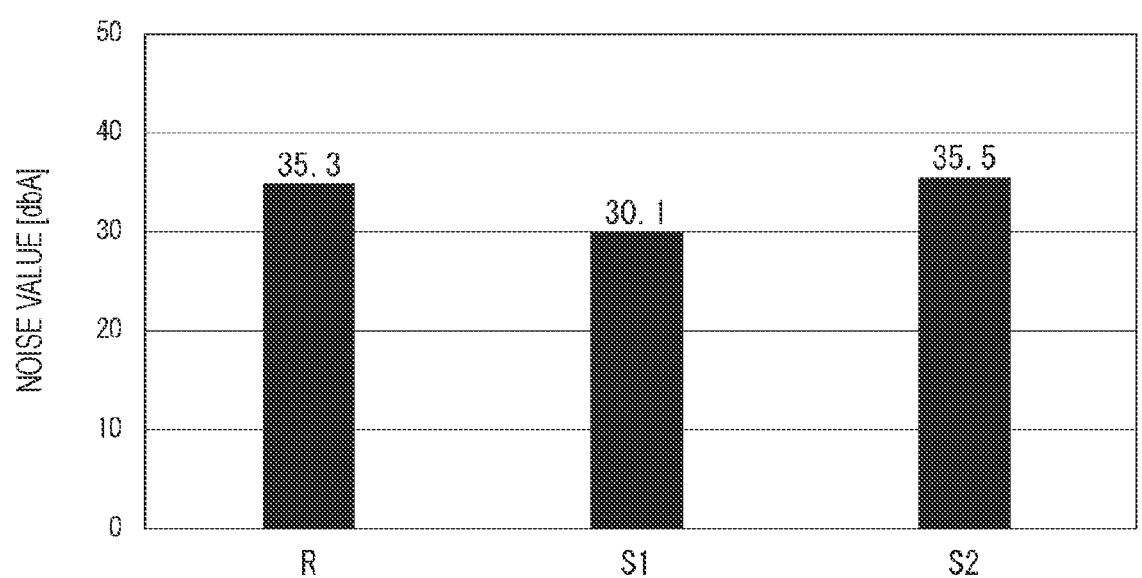
FIG. 7 is a graph showing a second measurement result regarding a noise level.
Figure 8:
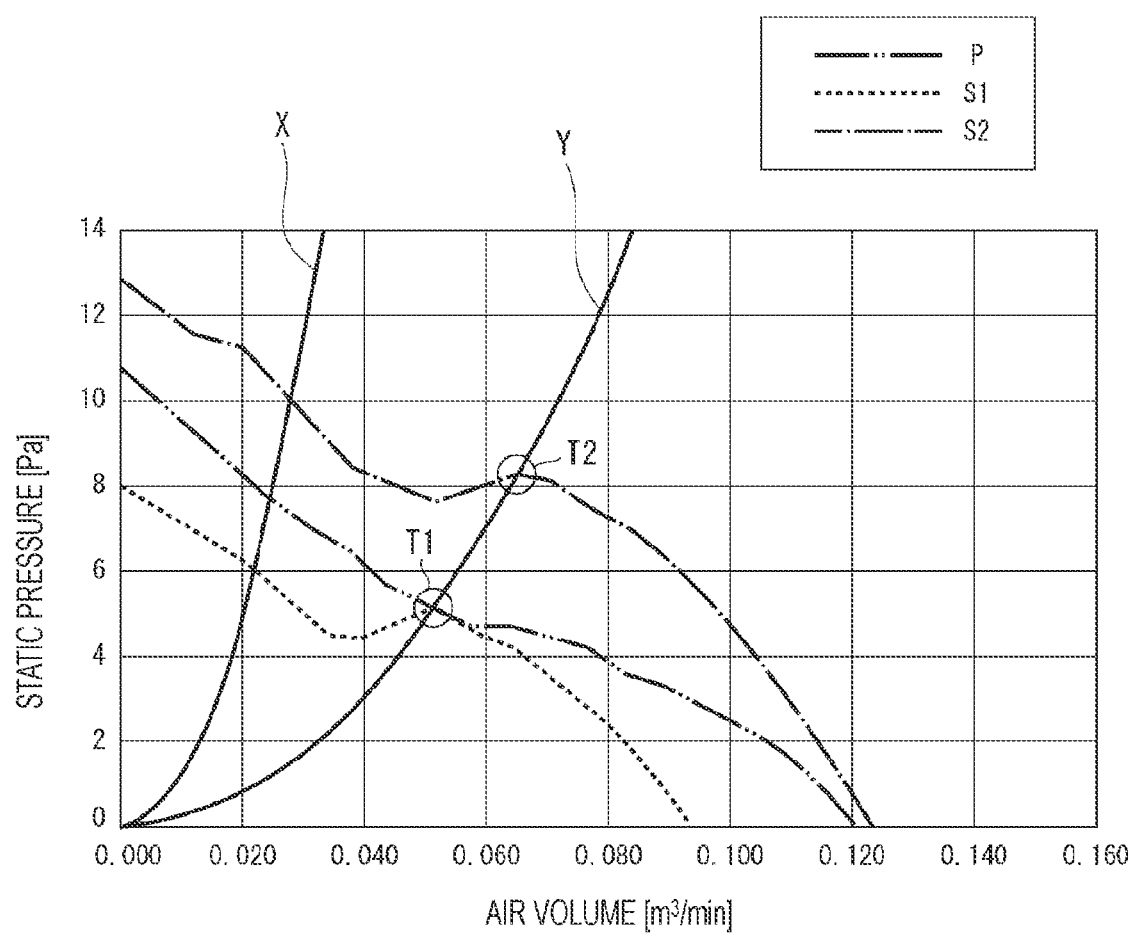
FIG. 8 is a graph showing the second measurement result in a relationship between air volume and static pressure.

FIG. 8 is a result of measuring the static pressure when the air volume of the benchmark product and the counter-rotating fan 1 is changed, and is a result showing so-called P-Q characteristics. In FIG. 8, the horizontal axis shows air volume, the vertical axis shows static pressure, and data R, S1, and S2 are each data of the benchmark product or the counter-rotating fan 1 under the same conditions as in FIG. 7.

Graphs X and Y in FIG. 8 each show a resistance curve to air flow in a given electronic device (image capturing device), that is, ease (difficulty) of air flow inside the electronic device. For example, in the electronic device having the resistance curve of the graph Y, in a case where the counter-rotating fan 1 is used at the drive voltage at which the reference air volume is obtained, the static pressure is about 5 Pa (circled T1). In a case where the counter-rotating fan 1 is used at the drive voltage at which an air volume that increases by about 30% with respect to the reference air volume is obtained, the static pressure is about 8 Pa (circled T2).

<Conclusion>

As described above, the counter-rotating fan 1 includes the intake side fan 2 having the plurality of first impellers 10, 10, . . . , and the exhaust side fan 3 having the plurality of second impellers 20, 20, . . . and coupled with the intake side fan 2. The axial maximum chord length of the first impellers 10, 10, . . . is smaller than the axial maximum chord length of the second impellers 20, 20, . . . .

Generally, in a counter-rotating fan configured by coupling of two fans, since the air inhaled from the intake side fan is blown out from the exhaust side fan, turbulence is likely to enter the exhaust side fan from the intake side fan, and the noise level of the exhaust side fan tends to be higher than the noise level of the intake side fan. Therefore, in order to reduce the noise level of the exhaust side fan, it is considered to reduce the number of rotations of the exhaust side fan. However, if the number of rotations of the exhaust side fan is reduced, there is a possibility that the air volume of the whole counter-rotating fan may decrease.

Therefore, as in the counter-rotating fan 1 described above, by making the axial maximum chord length of the first impellers 10, 10, . . . smaller than the axial maximum chord length of the second impellers 20, 20, . . . and making the axial maximum chord length of the second impellers 20, 20, . . . larger than the axial maximum chord length of the first impellers 10, 10, . . . , even if the number of rotations of the exhaust side fan 3 is reduced, it becomes possible to obtain a sufficient air volume in the exhaust side fan 3, it becomes possible to reduce sound by reducing the number of rotations of the exhaust side fan 3, and sound reduction can be achieved after securing a sufficient air volume of the counter-rotating fan 1 as a whole.

Figure 6:
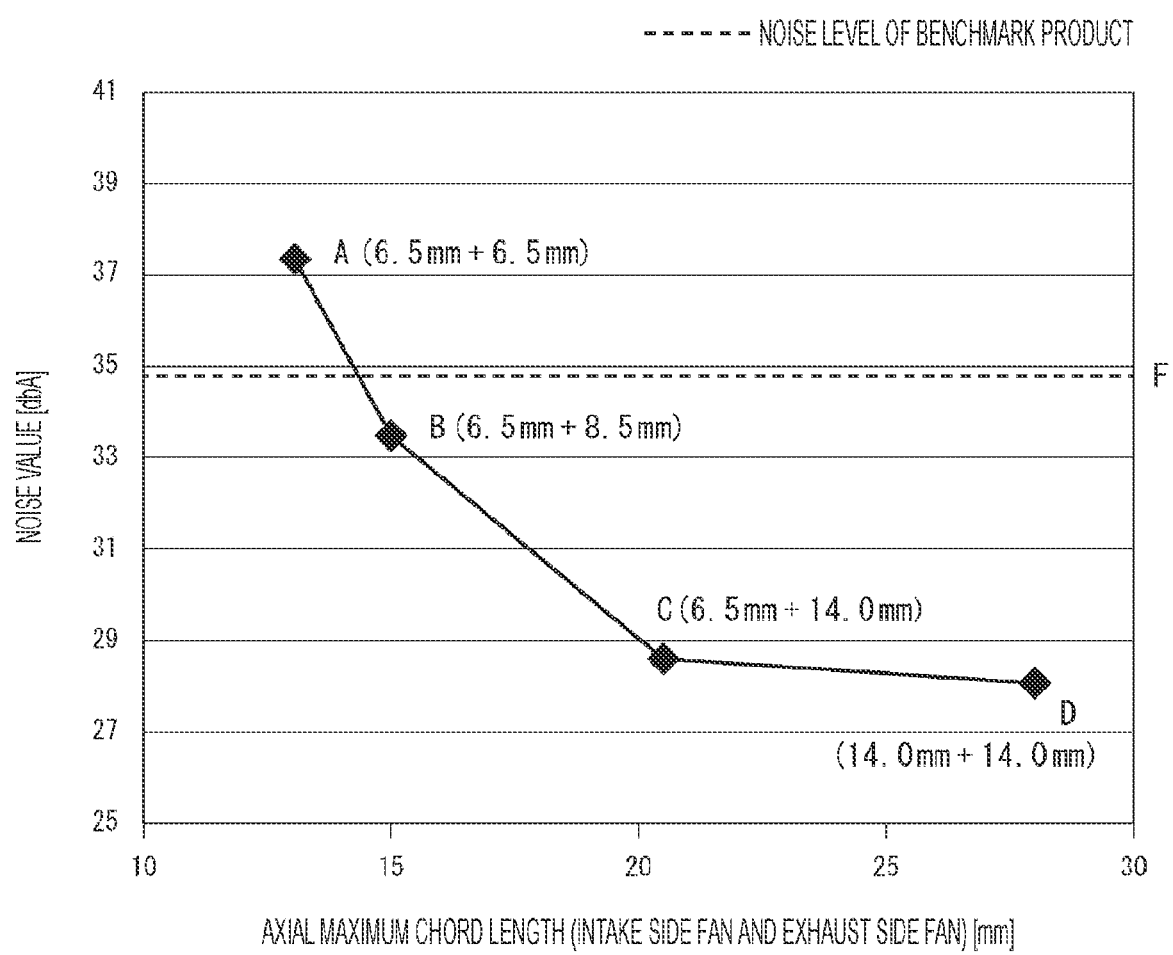
FIG. 6 is a graph showing a first measurement result.

Furthermore, as shown by comparing the counter-rotating fan C and the counter-rotating fan D in FIG. 6, if the axial maximum chord length of the exhaust side fan is larger than a certain level, the noise level is unlikely to decrease even if the axial maximum chord length of the intake side fan increases. Therefore, by making the axial maximum chord length of the intake side fan smaller than the axial maximum chord length of the axial maximum chord length of the exhaust side fan, it is possible to reduce the noise level while securing miniaturization.

Moreover, in the counter-rotating fan 1, the number of first impellers 10, 10, . . . is larger than the number of second impellers 20, 20, . . . .

Therefore, since it is possible to increase the air volume of the intake side fan 2 whose axial maximum chord length is smaller than the axial maximum chord length of the exhaust side fan 3, drive efficiency of the counter-rotating fan 1 increases, and a sufficient air volume during driving can be secured.

Note that in the example described above, the number of first impellers 10 in the intake side fan 2 is nine and the number of second impellers 20 in the exhaust side fan 3 is four. If it is possible to secure the required air volume in the counter-rotating fan 1, it is possible to set each of the number of first impellers 10 in the intake side fan 2 and the number of second impellers 20 in the exhaust side fan 3 at an arbitrary number.

Moreover, in the counter-rotating fan 1, the number of rotations of the first impellers 10, 10, . . . is larger than the number of rotations of the second impellers 20, 20, . . . , making it possible to increase the air volume of the intake side fan 2 whose axial maximum chord length is smaller than the axial maximum chord length of the exhaust side fan 3. Therefore, the drive efficiency of the counter-rotating fan 1 increases, and a sufficient air volume during driving can be secured.

Furthermore, the diameter of the first hub 9 is equal to or less than half of one side of the first housing 4 in the coupling direction of the intake side fan 2 and the exhaust side fan 3, and the diameter of the second hub 19 is equal to or less than half of one side of the second housing 14 in the coupling direction of the intake side fan 2 and the exhaust side fan 3.

Therefore, the sizes of the first hub 9 and the second hub 19 are relatively small with respect to the total sizes of the intake side fan 2 and the exhaust side fan 3, respectively. Accordingly, it is possible to increase the radial chord lengths of the first impellers 10, 10, . . . and the second impellers 20, 20, . . . and to increase the air volume.

In particular, since the diameters of the first hub 9 and the second hub 19 are 20 mm or less, the sizes of the first hub 9 and the second hub 19 decrease. Therefore, it is possible to increase the radial chord lengths of the first impellers 10, 10, . . . and the second impellers 20, 20, . . . and to increase the air volume sufficiently.

Furthermore, the intake side fan 2 is provided with the plurality of first stays 5, 5, . . . to hold the first drive motor 7, and the exhaust side fan 3 is provided with the plurality of second stays 15, 15, . . . to hold the second drive motor 17. The first stays 5, 5, . . . are positioned at the end on the exhaust side fan 3 side, and the second stays 15, 15, . . . are positioned at the end on the intake side fan 2 side.

Therefore, since the first stays 5, 5, . . . and the second stays 15, 15, . . . are positioned adjacent to each other, effects of the first stays 5, 5, . . . and the second stays 15, 15, . . . on the air flowing from the intake side fan 2 to the exhaust side fan 3 decrease. Turbulence is unlikely to occur in the air taken in by the intake side fan 2, and the drive efficiency of the counter-rotating fan 1 can be improved.

In particular, in the counter-rotating fan 1, four first stays 5, 5, . . . and four second stays 15, 15, . . . are provided, and the first stays 5, 5, . . . and the second stays 15, 15, . . . are each positioned at equal spaces in a circumferential direction.

Therefore, since the first stays 5, 5, . . . and the second stays 15, 15, . . . are each positioned adjacent to each other at equal spaces, effects of the first stays 5, 5, . . . and the second stays 15, 15, . . . on the air flowing from the intake side fan 2 to the exhaust side fan 3 are minimized. Turbulence is unlikely to occur in the air taken in by the intake side fan 2, and a stable holding state of the first drive motor 7 and the second drive motor 17 is secured. The drive efficiency and strength of the counter-rotating fan 1 can be improved.

In addition, by using a 40 mm square type as the intake side fan 2 and the exhaust side fan 3, both the intake side fan 2 and the exhaust side fan 3 are miniaturized, and the counter-rotating fan 1 is miniaturized as a whole. The counter-rotating fan 1 can be suitably used for small devices.

Furthermore, by setting the axial maximum chord length of the first impellers 10, 10, . . . at 6.5 mm and setting the axial maximum chord length of the second impellers 20, 20, . . . at 14.0 mm, the axial maximum chord length of the whole counter-rotating fan 1 is not increased more than necessary, and thus noise can be suppressed while securing a sufficient air volume during driving.

Moreover, in the counter-rotating fan 1, the first sleeve bearing 12 and the second sleeve bearing 22 are used as bearing members.

Therefore, low-frequency noise is unlikely to occur in a low rotation state as in a case where ball bearings are used, and costs can be reduced and sound reduction can be achieved more than in a case where ball bearings are used.

Furthermore, in the example described above, the number of first stays 5, 5, . . . provided in the intake side fan 2 is four and the number of second stays 15, 15, . . . provided in the exhaust side fan 3 is four. However, the numbers of the first stays 5, 5, . . . and the second stays 15, 15, . . . are arbitrary as long as the stable holding state of the first drive motor 7 and the second drive motor 17 is secured.

However, if the numbers of the first stays 5, 5, . . . and the second stays 15, 15, . . . increase more than necessary, there is a possibility that flow space of the air from the intake side fan 2 toward the exhaust side fan 3 and flow space of the air discharged from the exhaust side fan 3 are not sufficiently secured, and that the air volume will decrease and the noise level will increase. Therefore, in order to secure the stable holding state of the first drive motor 7 and the second drive motor 17, and to inhibit a decrease in the air volume and an increase in the noise level, it is preferable that at least three first stays 5, 5, . . . and three second stays 15, 15, . . . are provided. Furthermore, as described above, it is a more preferable form that four first stays 5, 5, . . . and four second stays 15, 15, . . . are provided from the viewpoint of securing the stable holding state of the first drive motor 7 and the second drive motor 17 and inhibiting a decrease in the air volume and an increase in the noise level.

<Other>

In the example described above, the intake side fan 2 having the first stays 5, 5, . . . inclined in the left-right direction and the exhaust side fan 3 having the second stays 15, 15, . . . positioned extending in the up-down direction or left-right direction are coupled with each other, and the positions of the first stays 5, 5, . . . with respect to the first housing 4 are different from the positions of the second stays 15, 15, . . . with respect to the second housing 14.

Figure 9:
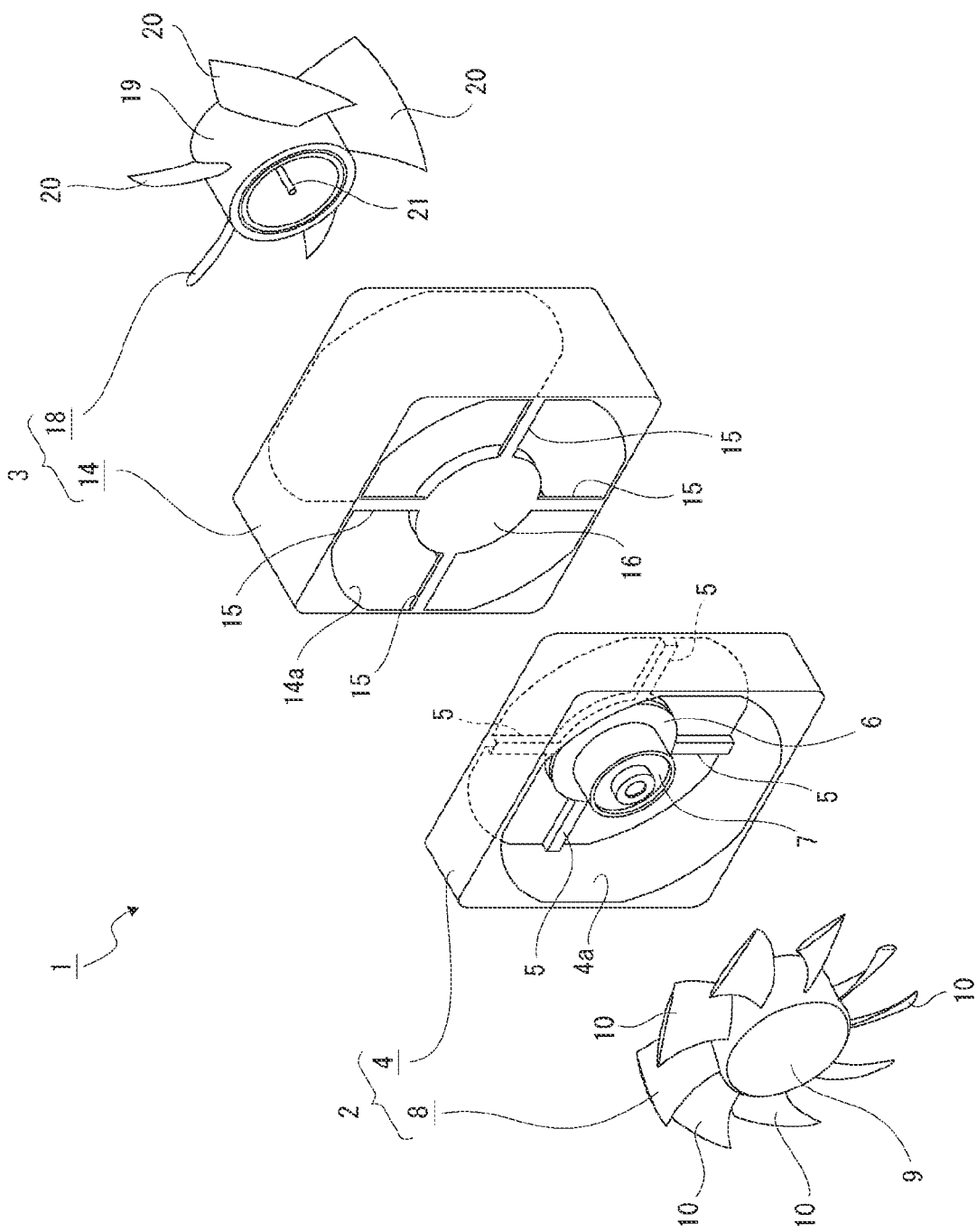
FIG. 9 is an exploded perspective view showing an example of the counter-rotating fan in which first stays and second stays face each other.

However, the first stays 5, 5, . . . and the second stays 15, 15, . . . may exist at the same position with respect to the first housing 4 and the second housing 14, respectively. The first stays 5, 5, . . . and the second stays 15, 15, . . . may be positioned facing each other in the front-back direction (see FIG. 9). In this case, both the first stays 5, 5, . . . and the second stays 15, 15, . . . may be inclined in the left-right direction, and both may be positioned extending in the up-down direction or left-right direction.

In this way, since the first stays 5, 5, . . . and the second stays 15, 15, . . . are positioned facing each other in the coupling direction of the intake side fan 2 and the exhaust side fan 3, effects of the first stays 5, 5, . . . and the second stays 15, 15, . . . on the air flowing from the intake side fan 2 to the exhaust side fan 3 decrease, turbulence is unlikely to occur in the air taken in by the intake side fan 2 and heading for the exhaust side fan 3, and the drive efficiency of the counter-rotating fan 1 can be improved.

<Configuration of Image Capturing Device>

Figure 10:
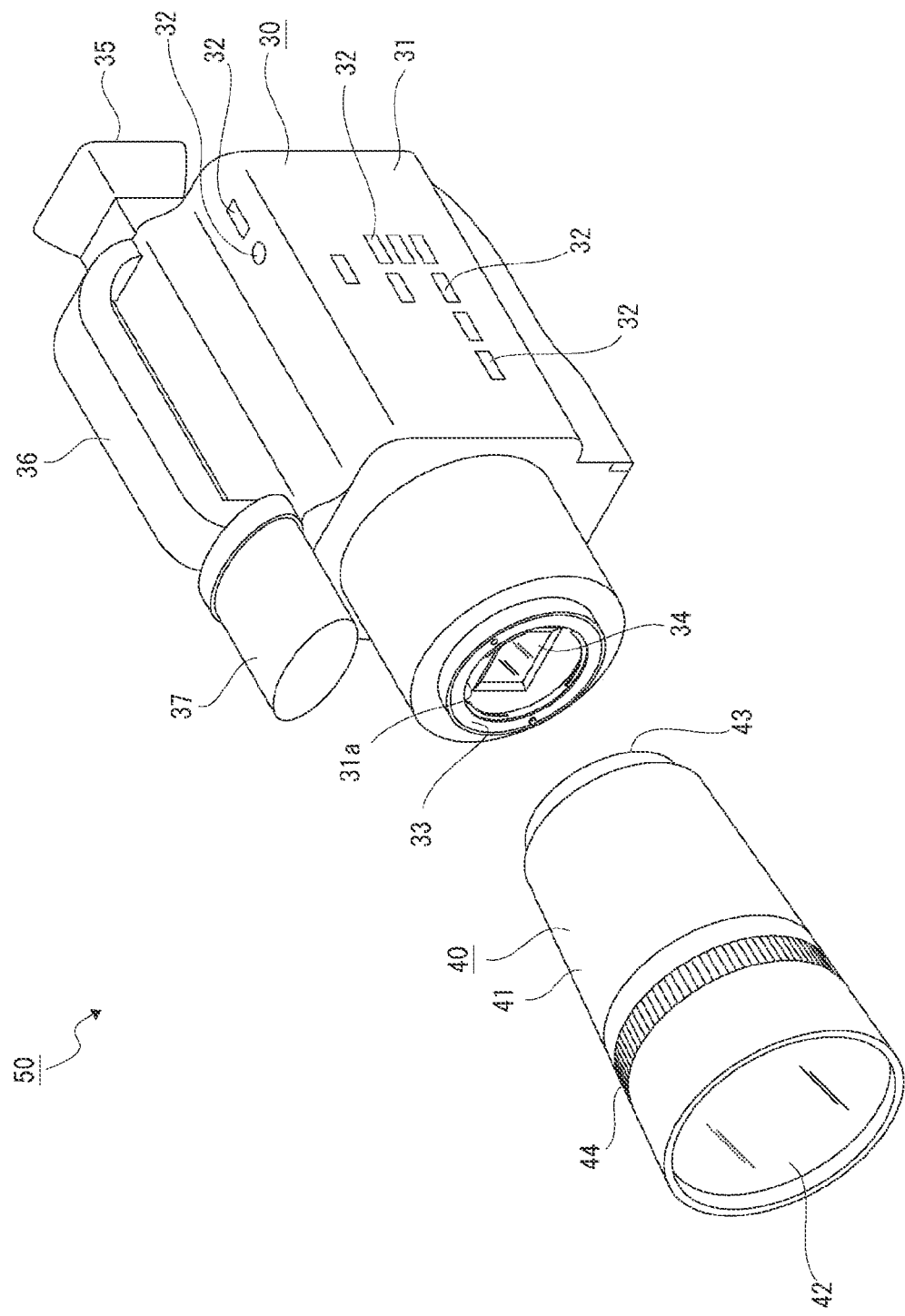
FIG. 10 is a perspective view showing one example of the image capturing device using the counter-rotating fan.

Next, one example of the image capturing device in which the counter-rotating fan 1 described above is used will be described (see FIG. 10). Note that the counter-rotating fan 1 may be used in any part and any position of the image capturing device 50 shown below.

The image capturing device 50 includes a device body 30 and an interchangeable lens 40.

In the device body 30, necessary units are disposed inside and outside an outer enclosure 31.

On the outer enclosure 31, for example, various operation units 32, 32, . . . are disposed on each surface such as an upper surface, a rear surface, and a side surface. As the operation units 32, 32, . . . , for example, a power button, an image capturing button, a zoom knob, a mode switching knob, and the like are provided.

A circular opening 31a is formed on the front surface of the outer enclosure 31. A peripheral portion of the opening 31a is provided as a mounting portion 33 for mounting the interchangeable lens 40.

An image capturing element 34 such as a charge coupled device (CCD) or complementary metal-oxide semiconductor (CMOS) is disposed inside the outer enclosure 31, and the image capturing element 34 is positioned behind the opening 31a.

The device body 30 is provided with a viewfinder 35 at a rear end and a handle 36 at an upper end. A microphone 37 is attached to a front end of the handle 36. Furthermore, a speaker (not shown) is disposed in the device body 30.

The interchangeable lens 40 is, for example, an interchangeable lens for a digital camera of an interchangeable lens type.

The interchangeable lens 40 includes an enclosure 41 formed substantially cylindrically and an image capturing lens 42 disposed on the foremost side. At a rear end of the interchangeable lens 40, a lens mount 43 to be coupled to the mounting portion 33 of the device body 30 is provided. The interchangeable lens 40 is provided with, for example, an operation ring 44 that functions as a manual focus ring.

Note that in addition to the operation ring 44, the interchangeable lens 40 may be provided with an operation ring for opening and closing a zoom ring and an iris, and the like.

Inside the enclosure 41, a plurality of optical elements (not shown) arranged in an optical axial direction (front-back direction) is arranged. As the optical elements, for example, a lens group, an iris blade, and the like are arranged.

Figure 11:
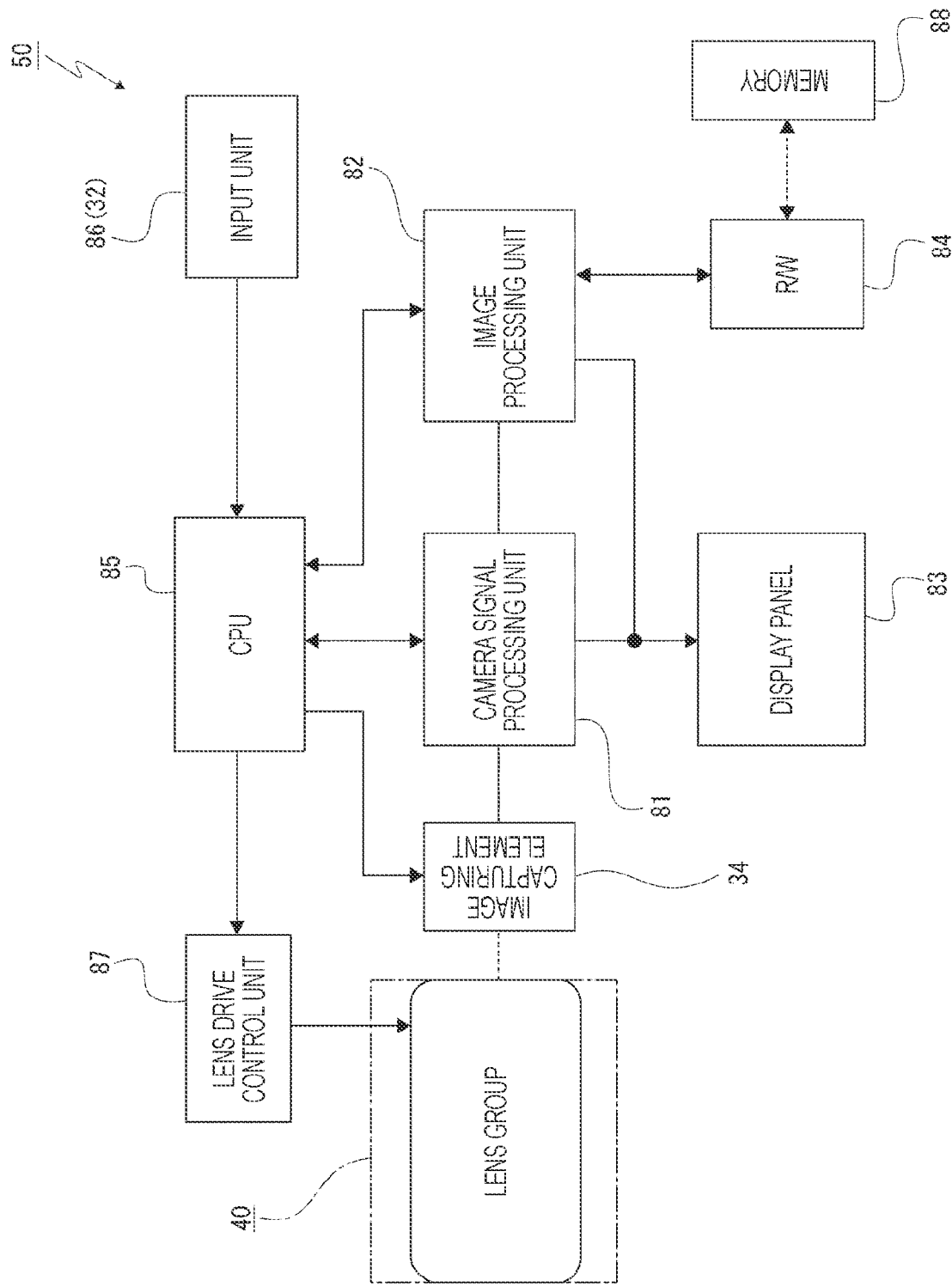
FIG. 11 is a block diagram showing one example of the image capturing device using the counter-rotating fan.

A configuration example of one embodiment of the image capturing device 50 will be described below (see FIG. 11).

The image capturing device 50 includes the image capturing element 34 having a photoelectric conversion function of converting acquired light into an electric signal, a camera signal processing unit 81 that performs signal processing such as analog-to-digital conversion of the captured image signal, and an image processing unit 82 that performs recording and reproducing processing on the image signal. Furthermore, the image capturing device 50 includes a display unit 83 that displays the captured image and the like, a reader/writer (R/W) 84 that writes and reads the image signal to and from a memory 88, a central processing unit (CPU) 85 that controls the whole image capturing device 50, an input unit 86 (operation unit 32) such as various switches where required operations are performed by a user, and a lens drive control unit 87 that controls the drive of the lens group (movable group).

The camera signal processing unit 81 performs various types of signal processing including conversion of an output signal from the image capturing element 34 to a digital signal, noise removal, image quality correction, conversion to a luminance/color difference signal, and the like.

The image processing unit 82 performs compression coding and decompression decoding processing on an image signal based on a predetermined image data format, conversion processing on data specifications such as resolution, and the like.

The display unit 83 has a function of displaying various data including an operation state of the user on the input unit 86, a captured image, and the like.

The R/W 84 writes the image data encoded by the image processing unit 82 to the memory 88 and reads image data recorded in the memory 88.

The CPU 85 functions as a control processing unit that controls each circuit block provided in the image capturing device 50, and controls each circuit block on the basis of an instruction input signal and the like from the input unit 86.

The input unit 86 outputs the instruction input signal in response to the operation by the user to the CPU 85.

The lens drive control unit 87 controls a motor and the like (not shown) that drives the lens group on the basis of a control signal from the CPU 85.

The memory 88 is, for example, a semiconductor memory attachable to and detachable from a slot connected to the R/W 84. Note that the memory 88 may not be attachable to and detachable from a slot and may be incorporated inside the image capturing device 50.

Operations of the image capturing device 50 will be described below.

In a standby state for image capturing, under the control of the CPU 85, the captured image signal is output to the display unit 83 via the camera signal processing unit 81 and displayed as a camera-through image. Furthermore, if an instruction input signal for zooming is input from the input unit 86, the CPU 85 outputs a control signal to the lens drive control unit 87, and the predetermined lens group is moved on the basis of the control of the lens drive control unit 87.

If image capturing is performed according to the instruction input signal from the input unit 86, the captured image signal is output from the camera signal processing unit 81 to the image processing unit 82, undergoes compression coding processing, and is converted into digital data in a predetermined data format. The converted data is output to the R/W 84 and written to the memory 88.

Focusing is performed by the lens drive control unit 87 moving the predetermined lens group on the basis of the control signal from the CPU 85.

In a case where the image data recorded in the memory 88 is reproduced, in response to the operation on the input unit 86, the R/W 84 reads the predetermined image data from the memory 88, the image processing unit 82 performs decompression decoding processing, and then the reproduced image signal is output to the display unit 83 and the reproduced image is displayed.

Note that in the present technology, the "image capturing" refers to processes including only part of or all of a series of processes including a photoelectric conversion process to convert light taken in by the image capturing element 34 into an electric signal, conversion of an output signal from the image capturing element 34 into a digital signal by the camera signal processing unit 81, noise removal, image quality correction, process such as conversion to a luminance/color difference signal, compression coding and decompression decoding processing on an image signal based on a predetermined image data format by the image processing unit 82, conversion processing of data specifications such as resolution, and processing of writing an image signal to the memory 88 by the R/W 84.

That is, the "image capturing" may refer only to the photoelectric conversion process to convert light taken in by the image capturing element 34 into an electric signal. The "image capturing" may refer to processes from the photoelectric conversion process to convert light taken in by the image capturing element 34 into an electric signal to processes such as conversion of an output signal from the image capturing element 34 into a digital signal by the camera signal processing unit 81, noise removal, image quality correction, and conversion to a luminance/color difference signal. The "image capturing" may refer to processes from the photoelectric conversion process to convert light taken in by the image capturing element 34 into an electric signal through processes such as conversion of an output signal from the image capturing element 34 into a digital signal by the camera signal processing unit 81, noise removal, image quality correction, and conversion to a luminance/color difference signal to the compression coding and decompression decoding process on an image signal based on a predetermined image data format by the image processing unit 82 and the conversion process of data specifications such as resolution. The "image capturing" may refer to processes from the photoelectric conversion process to convert light taken in by the image capturing element 34 into an electric signal, processes such as conversion of an output signal from the image capturing element 34 into a digital signal by the camera signal processing unit 81, noise removal, image quality correction, and conversion to a luminance/color difference signal, and through the compression coding and decompression decoding process on an image signal based on a predetermined image data format by the image processing unit 82 and the conversion process of data specifications such as resolution. The "image capturing" may refer to the process of writing an image signal to the memory 88 by the R/W 84. In the processes described above, order of each process may be changed as appropriate.

Furthermore, in the present technology, the interchangeable lens 40 and the image capturing device 50 may include only part of or all of the image capturing element 34, the camera signal processing unit 81, the image processing unit 82, and the R/W 84 that perform the above-described processes.

Furthermore, the interchangeable lens 40 may include part of the image capturing element 34, the camera signal processing unit 81, the image processing unit 82, and the R/W 84, and the device body 30 may include the rest.

<The Present Technology>

The present technology can also have the following configurations.

(1)

A counter-rotating fan including:

an intake side fan including a first housing, a first drive motor that functions as a drive source, a first hub that is rotated by drive force of the first drive motor, and a plurality of first impellers that is rotated along with the first hub; and an exhaust side fan including a second housing, a second drive motor that functions as a drive source, a second hub that is rotated by drive force of the second drive motor, and a plurality of second impellers that is rotated along with the second hub, in which an axial maximum chord length of the first impellers is smaller than an axial maximum chord length of the second impellers.

(2)

The counter-rotating fan according to (1) described above, in which a number of the first impellers is larger than a number of the second impellers.

(3)

The counter-rotating fan according to (1) or (2) described above, in which a number of rotations of the first impellers is larger than a number of rotations of the second impellers.

(4)

The counter-rotating fan according to any one of (1) to (3) described above, in which the first hub and the plurality of first impellers are positioned inside the first housing, the second hub and the plurality of second impellers are positioned inside the second housing, a diameter of the first hub is equal to or less than half of one side of the first housing in a direction orthogonal to a coupling direction of the intake side fan and the exhaust side fan, and a diameter of the second hub is equal to or less than half of one side of the second housing in the direction orthogonal to the coupling direction of the intake side fan and the exhaust side fan.

(5)

The counter-rotating fan according to (4) described above, in which the diameters of the first hub and the second hub are equal to or less than 20 mm.

(6)

The counter-rotating fan according to any one of (1) to (5) described above, in which the intake side fan is provided with a plurality of first stays that protrudes from the first housing and holds the first drive motor, the exhaust side fan is provided with a plurality of second stays that protrudes from the second housing and holds the second drive motor, the first stays are positioned at an end on a side of the exhaust side fan, and the second stays are positioned at an end on a side of the intake side fan.

(7)

The counter-rotating fan according to (6) described above, in which equal numbers of the first stays and the second stays are provided, and the first stays and the second stays are positioned facing each other in a coupling direction of the intake side fan and the exhaust side fan.

(8)

The counter-rotating fan according to (6) or (7) described above, in which the first stays and the second stays are each provided in fours, and the plurality of first stays and the plurality of second stays are each positioned at equal spaces in a circumferential direction.

(9)

The counter-rotating fan according to any one of (1) to (8) described above, in which a 40 mm square type is used as the intake side fan and the exhaust side fan.

(10)

An image capturing device including:

an image capturing element that is disposed inside an outer enclosure and converts an optical image into an electrical signal; and a counter-rotating fan that cools each unit disposed inside the outer enclosure, in which the counter-rotating fan includes:

an intake side fan including a first housing, a first drive motor that functions as a drive source, a first hub that is rotated by drive force of the first drive motor, and a plurality of first impellers that is rotated along with the first hub; and an exhaust side fan including a second housing, a second drive motor that functions as a drive source, a second hub that is rotated by drive force of the second drive motor, and a plurality of second impellers that is rotated along with the second hub, and an axial maximum chord length of the first impellers is smaller than an axial maximum chord length of the second impellers.

REFERENCE SIGNS LIST

1 Counter-rotating fan
2 Intake side fan
3 Exhaust side fan
4 First housing
5 First stay
7 First drive motor
9 First hub
10 First impeller
14 Second housing
15 Second stay
17 Second drive motor
19 Second hub
20 Second impeller
50 Image capturing device
31 Outer enclosure
34 Image capturing element

The invention claimed is:

1. A counter-rotating fan, comprising:

an intake side fan including a first housing, a first drive motor that functions as a drive source, a first hub that is rotated by drive force of the first drive motor, and a plurality of first impellers that is rotated along with the first hub; and an exhaust side fan including a second housing, a second drive motor that functions as a drive source, a second hub that is rotated by drive force of the second drive motor, and a plurality of second impellers that is rotated along with the second hub, wherein an axial maximum chord length of the first impellers is smaller than an axial maximum chord length of the second impellers.

2. The counter-rotating fan according to claim 1, wherein a number of the first impellers is larger than a number of the second impellers.

3. The counter-rotating fan according to claim 1, wherein a number of rotations of the first impellers is larger than a number of rotations of the second impellers.

4. The counter-rotating fan according to claim 1, wherein the first hub and the plurality of first impellers are positioned inside the first housing, the second hub and the plurality of second impellers are positioned inside the second housing, a diameter of the first hub is equal to or less than half of one side of the first housing in a direction orthogonal to a coupling direction of the intake side fan and the exhaust side fan, and a diameter of the second hub is equal to or less than half of one side of the second housing in the direction orthogonal to the coupling direction of the intake side fan and the exhaust side fan.

5. The counter-rotating fan according to claim 4, wherein the diameters of the first hub and the second hub are equal to or less than 20 mm.

6. The counter-rotating fan according to claim 1, wherein the intake side fan is provided with a plurality of first stays that protrudes from the first housing and holds the first drive motor, the exhaust side fan is provided with a plurality of second stays that protrudes from the second housing and holds the second drive motor, the plurality of first stays are positioned at an end on a side of the exhaust side fan, and the plurality of second stays are positioned at an end on a side of the intake side fan.

7. The counter-rotating fan according to claim 6, wherein equal numbers of the plurality of first stays and the plurality of second stays are provided, and the plurality of first stays and the plurality of second stays are positioned facing each other in a coupling direction of the intake side fan and the exhaust side fan.

8. The counter-rotating fan according to claim 6, wherein the plurality of first stays and the plurality of second stays are each provided in fours, and
the plurality of first stays and the plurality of second stays are each positioned at equal spaces in a circumferential direction.

9. The counter-rotating fan according to claim 1, wherein a 40 mm square type is used as the intake side fan and the exhaust side fan.

10. An image capturing device, comprising:
an image capturing element that is disposed inside an outer enclosure and converts an optical image into an electrical signal; and
a counter-rotating fan that cools each unit disposed inside the outer enclosure, wherein
the counter-rotating fan includes:
an intake side fan including a first housing, a first drive motor that functions as a drive source, a first hub that is rotated by drive force of the first drive motor, and a plurality of first impellers that is rotated along with the first hub; and
an exhaust side fan including a second housing, a second drive motor that functions as a drive source, a second hub that is rotated by drive force of the second drive motor, and a plurality of second impellers that is rotated along with the second hub, and
an axial maximum chord length of the first impellers is smaller than an axial maximum chord length of the second impellers.

* * * * *